US00RE48195E

(19) United States
(12) Reissued Patent
Marquard et al.

(10) Patent Number: US RE48,195 E
(45) Date of Reissued Patent: Sep. 8, 2020

(54) SPORT BOTTLE

(71) Applicant: WAVE HYDRATION LLC, Tigard, OR (US)

(72) Inventors: Conrad Marquard, Lake Oswego, OR (US); Robert Clark Workman, Tigard, OR (US)

(73) Assignee: WAVE HYDRATION LLC, Tigard, OR (US)

(21) Appl. No.: 29/679,629

(22) Filed: Feb. 7, 2019

Related U.S. Patent Documents

Reissue of:
(64) Patent No.: Des. 781,654
Issued: Mar. 21, 2017
Appl. No.: 29/554,670
Filed: Feb. 12, 2016

(51) LOC (12) Cl. ..... 07-01
(52) U.S. Cl.
USPC ..... D7/510
(58) Field of Classification Search
USPC ..... D7/509, 510, 511, 523, 538, 543
CPC ..... A47G 19/22; A47G 19/2205; A47G 19/2211; A47G 19/2216; A47G 19/2272; A47G 19/2288; A45F 3/16; A47J 43/27; B65D 41/04; B65D 41/56; B65D 43/02; B65D 47/08
See application file for complete search history.

(56) References Cited

U.S. PATENT DOCUMENTS

D421,547 S * 3/2000 Demers ..... D7/510
6,796,464 B1 * 9/2004 Tung ..... B65D 47/305 222/402.13
D508,185 S * 8/2005 Gauss ..... D7/392.1
D510,235 S * 10/2005 Sorensen ..... D7/510
D511,684 S * 11/2005 Guyot ..... D9/443
D543,454 S * 5/2007 Leoncavallo ..... D9/449
D547,607 S * 7/2007 Forsman ..... D7/396.2
D565,353 S * 4/2008 Roth ..... D7/510
D699,996 S * 2/2014 De Leo ..... D7/300.1
D702,503 S * 4/2014 Steel ..... D7/300.1
D730,694 S * 6/2015 Elsaden ..... D7/511
D755,562 S * 5/2016 Lindsay ..... D7/392.1
D795,009 S * 8/2017 Alprin ..... D7/392.1
D805,827 S * 12/2017 Toth ..... D7/300.1
D828,723 S * 9/2018 Gauss ..... D7/510
D830,772 S * 10/2018 Rosette ..... D7/510
(Continued)

*Primary Examiner* — Darlington Ly
(74) *Attorney, Agent, or Firm* — FisherBroyles LLP; Micah D. Stolowitz

(57) CLAIM

The ornamental design for a sport bottle, as shown and described.

DESCRIPTION

FIG. 1 is a perspective view of a sport bottle showing our new design;
FIG. 2 is a left side elevation view thereof;
FIG. 3 is a front elevation view thereof;
FIG. 4 is a right side elevation view thereof;
FIG. 5 is a rear elevation view thereof;
FIG. 6 is a top plan view thereof;
FIG. 7 is a bottom plan view thereof;
FIG. 8 is a perspective view thereof, showing the lid in a first use condition; and,
FIG. 9 is a perspective view thereof, [in another] *showing the lid in a second* use condition.
*The broken lines in the drawings illustrate portions of the sport bottle that form no part of the claimed design.*

1 Claim, 5 Drawing Sheets

Figure 1:
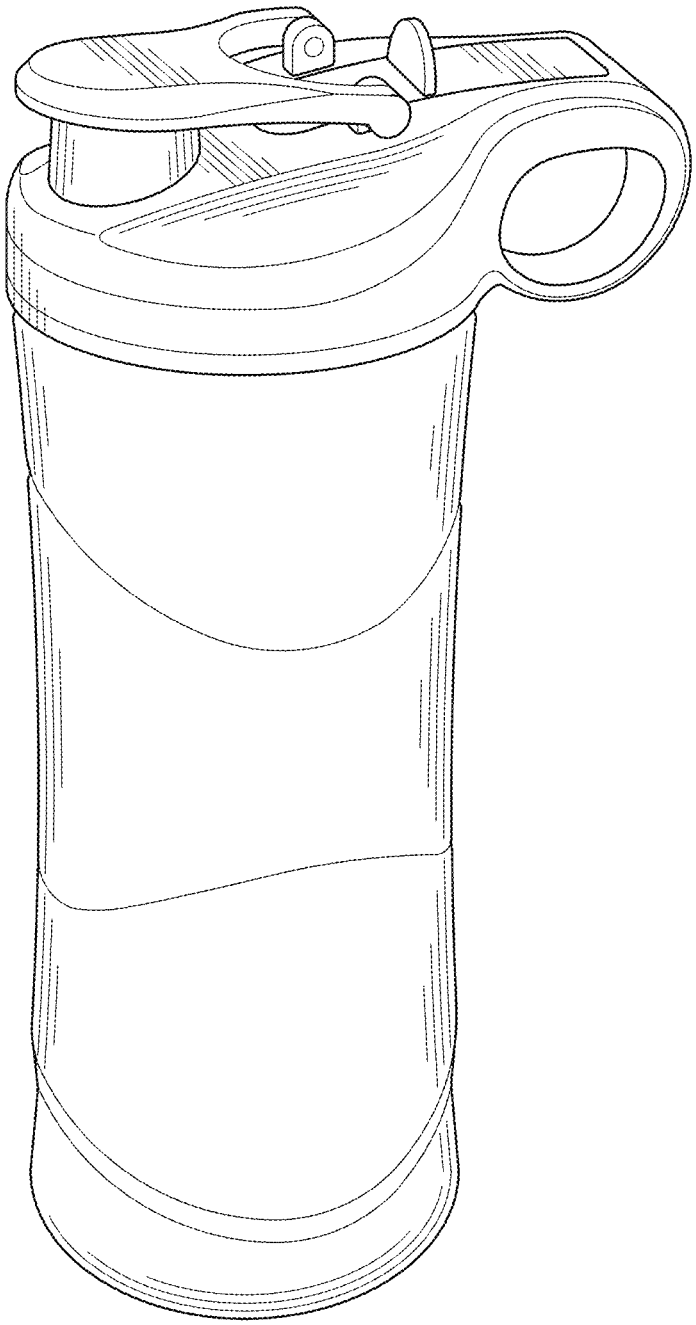
Figure 2:
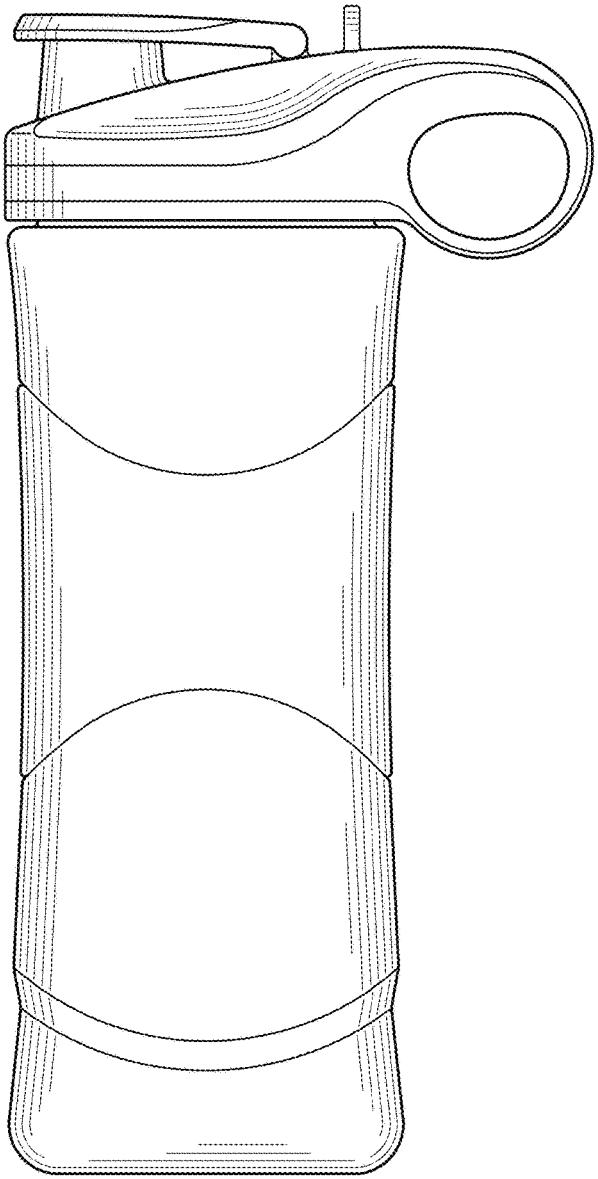
Figure 3:
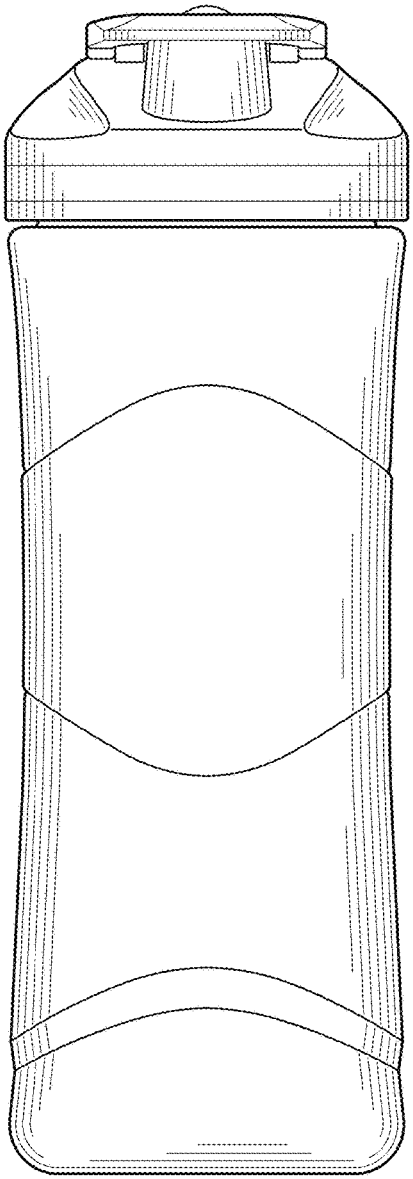
Figure 4:
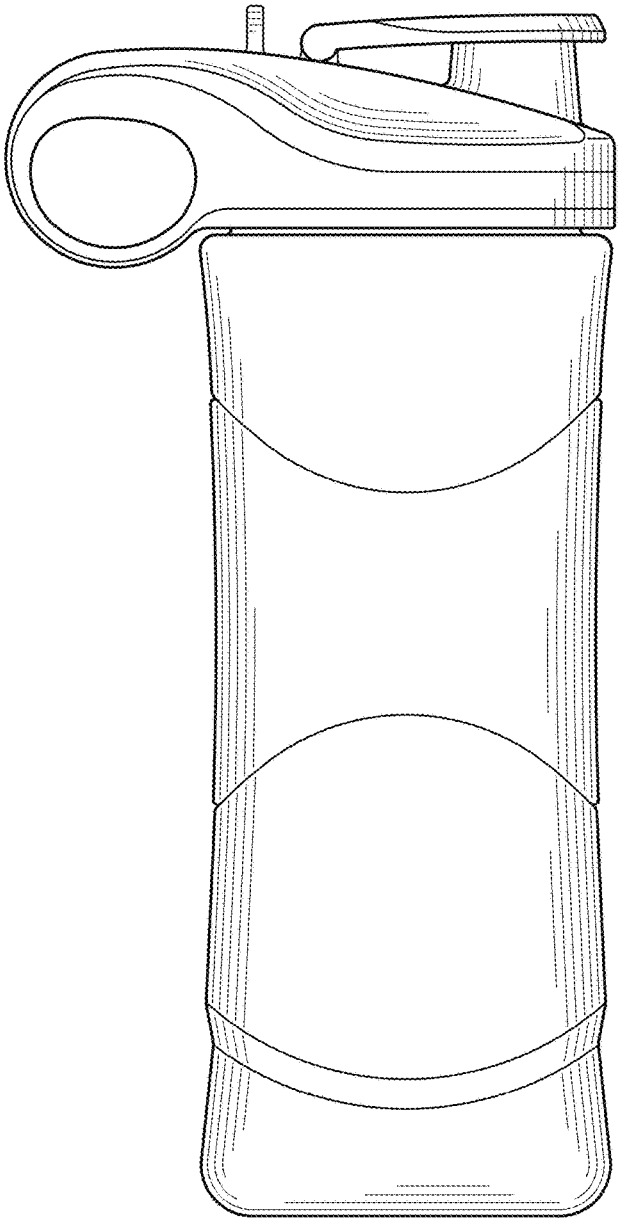
Figure 5:
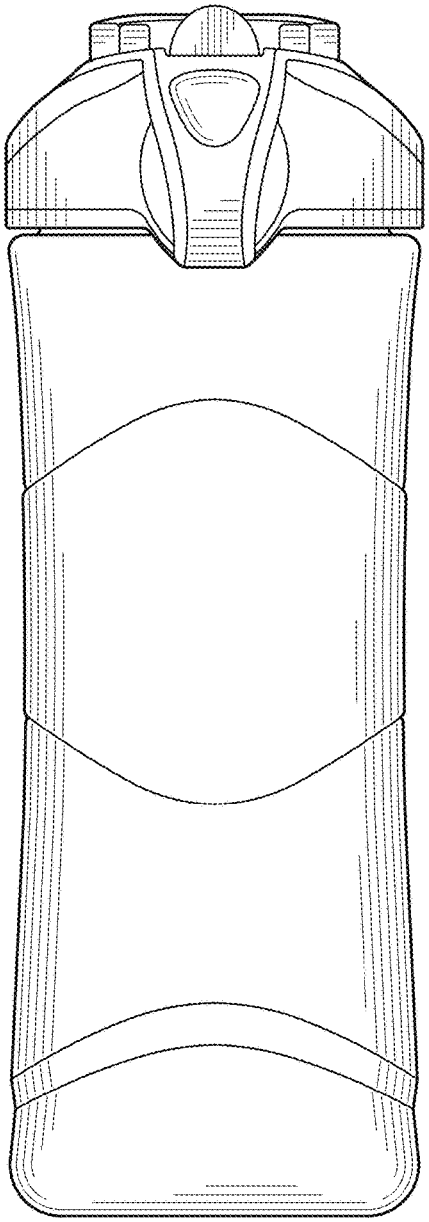
Figure 6:
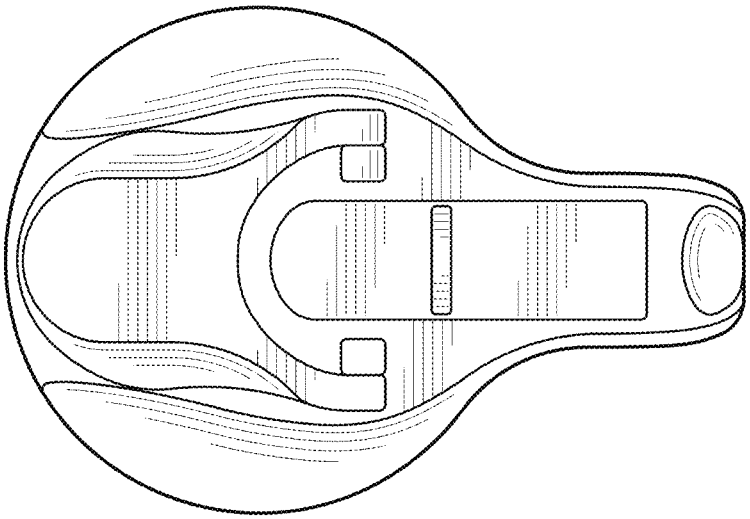
Figure 7:
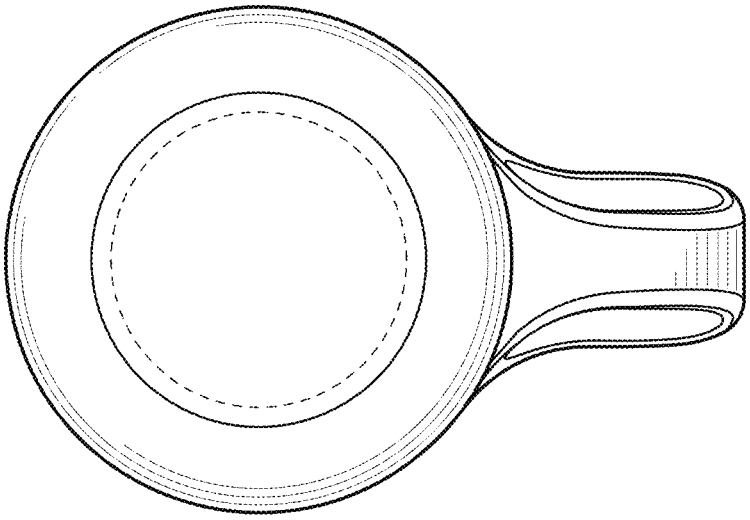
Figure 8:
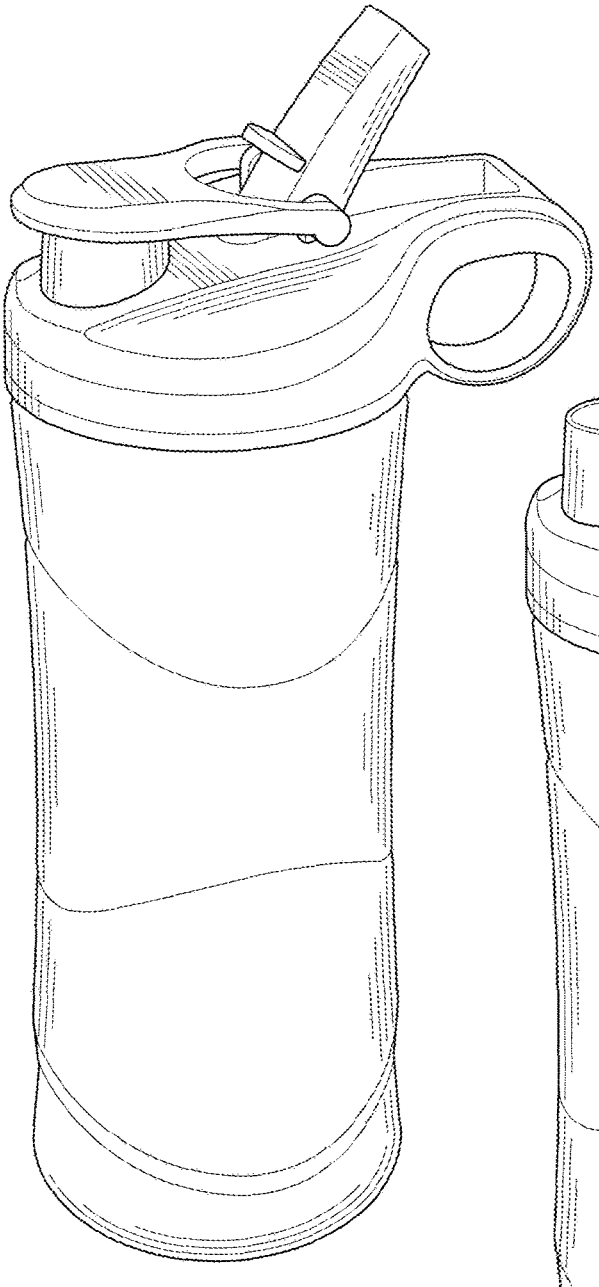
Figure 9:
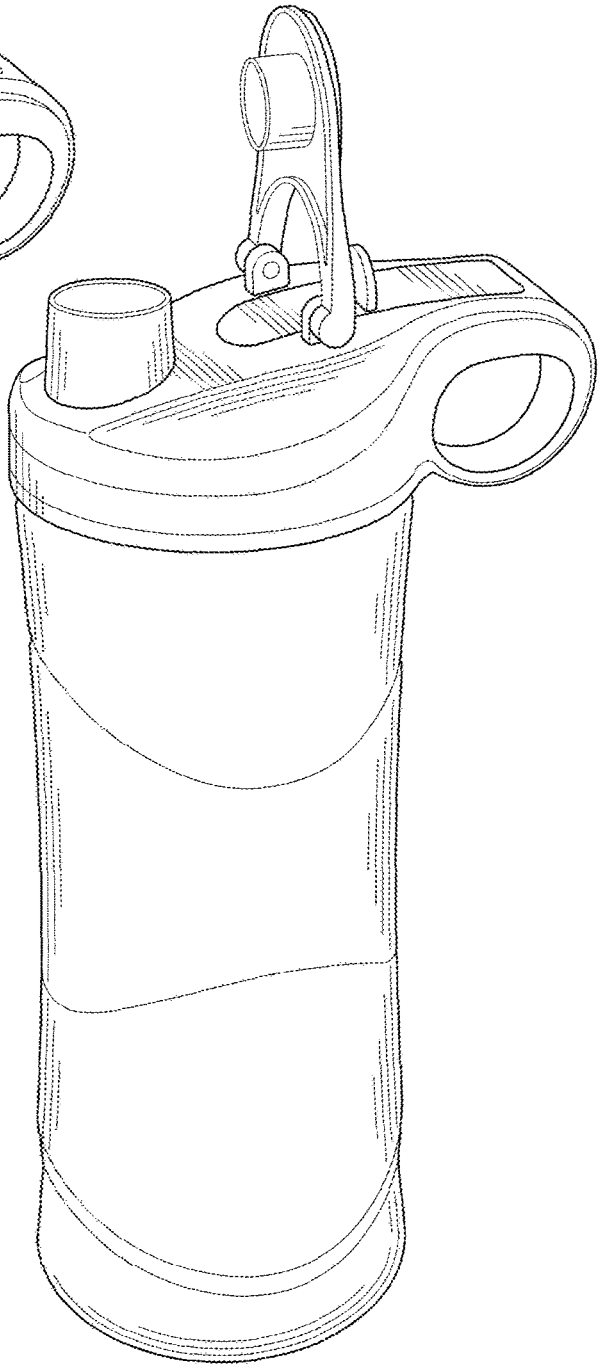

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| D844,376 | S | * | 4/2019 | Rosette | D7/392 |
| D871,144 | S | * | 12/2019 | Zhang | D7/510 |
| D879,555 | S | * | 3/2020 | Wang | D7/510 |
| D880,225 | S | * | 4/2020 | Peng | D7/392.1 |
| D885,129 | S | * | 5/2020 | Rosette | D7/510 |
| D885,131 | S | * | 5/2020 | Wang | D7/510 |
| 2004/0217139 | A1 | * | 11/2004 | Roth | B65D 47/243<br>224/148.7 |
| 2005/0115966 | A1 | * | 6/2005 | Leoncavallo | B65D 25/56<br>220/212.5 |
| 2006/0226110 | A1 | * | 10/2006 | Choi | B65D 47/065<br>215/228 |
| 2016/0249755 | A1 | * | 9/2016 | Sorensen | A47G 19/23<br>206/501 |

* cited by examiner